United States Patent
Tanabe et al.

(10) Patent No.: US 10,084,320 B2
(45) Date of Patent: Sep. 25, 2018

(54) ELECTRONIC APPARATUS CONFIGURED TO WIRELESSLY RECEIVE POWER FROM EXTERNAL APPARATUS

(71) Applicant: CANON KABUSHIKI KAISHA, Tokyo (JP)

(72) Inventors: Akihiro Tanabe, Tokyo (JP); Yudai Fukaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 14/858,485

(22) Filed: Sep. 18, 2015

(65) Prior Publication Data
US 2016/0087454 A1    Mar. 24, 2016

(30) Foreign Application Priority Data
Sep. 22, 2014 (JP) .................................. 2014-192881

(51) Int. Cl.
| | | |
|---|---|---|
| H02J 5/00 | (2016.01) | |
| H02J 7/02 | (2016.01) | |
| H02J 50/10 | (2016.01) | |
| H02J 50/60 | (2016.01) | |

(52) U.S. Cl.
CPC .............. *H02J 5/005* (2013.01); *H02J 7/025* (2013.01); *H02J 50/10* (2016.02); *H02J 50/60* (2016.02)

(58) Field of Classification Search
CPC .................................. H02J 50/12; H02J 50/60
See application file for complete search history.

(56) References Cited

U.S. PATENT DOCUMENTS

| | | | |
|---|---|---|---|
| 8,527,786 | B2 | 9/2013 | Nakano |
| 8,836,279 | B2 | 9/2014 | Nakano |
| 9,948,114 | B2 | 4/2018 | Tanabe |
| 2003/0015993 | A1 | 1/2003 | Misra |
| 2007/0021140 | A1 | 1/2007 | Keyes, IV |
| 2011/0244794 | A1 | 10/2011 | Nakano |
| 2011/0264297 | A1 | 10/2011 | Nakano |
| 2012/0001591 | A1 | 1/2012 | Fukaya |
| 2012/0040613 | A1 | 2/2012 | Nakano |
| 2012/0256495 | A1 | 10/2012 | Fukaya |
| 2013/0154557 | A1 | 6/2013 | Lee |
| 2013/0211606 | A1 | 8/2013 | Takemura |
| 2013/0211607 | A1 | 8/2013 | Takemura |
| 2013/0241293 | A1 | 9/2013 | Yamaguchi |

(Continued)

FOREIGN PATENT DOCUMENTS

| | | |
|---|---|---|
| CN | 102055219 A | 5/2011 |
| CN | 102201696 A | 9/2011 |

(Continued)

*Primary Examiner* — Jeffrey Shin
(74) *Attorney, Agent, or Firm* — Canon U.S.A., Inc. IP Division

(57) ABSTRACT

An electronic apparatus includes a power reception unit configured to wirelessly receive power from a power supply apparatus, a communication unit configured to receive a detection period, during which the power supply apparatus detects a foreign object, from the power supply apparatus and to notify a control unit of the detection period, the detection period, and the control unit configured to perform a process for keeping power consumed by the electronic apparatus in predetermined range constant until the detection period has elapsed.

9 Claims, 10 Drawing Sheets

(56) References Cited

U.S. PATENT DOCUMENTS

| | | |
|---|---|---|
| 2013/0264888 A1 | 10/2013 | Sako |
| 2013/0342160 A1 | 12/2013 | Tanabe |
| 2014/0084701 A1 | 3/2014 | Bae |
| 2014/0208131 A1 | 7/2014 | Kano |
| 2014/0292094 A1 | 10/2014 | Tsukamoto |
| 2014/0292095 A1 | 10/2014 | Tsukamoto |
| 2014/0365807 A1 | 12/2014 | Nakano |
| 2015/0061398 A1 | 3/2015 | Kudo |
| 2015/0372493 A1 | 12/2015 | Sankar |
| 2016/0164302 A1 | 6/2016 | Nakano |
| 2017/0018977 A1* | 1/2017 | Van Wageningen .... H02J 5/005 |

FOREIGN PATENT DOCUMENTS

| | | |
|---|---|---|
| CN | 103138358 A | 6/2013 |
| CN | 103368275 A | 10/2013 |
| JP | 2001-275266 A | 10/2001 |
| JP | 2008-113519 A | 5/2008 |
| JP | 2009124889 A | 6/2009 |
| JP | 2010104097 A | 5/2010 |
| JP | 2011152008 A | 8/2011 |
| JP | 2012170194 A | 9/2012 |
| JP | 2012222946 A | 11/2012 |
| JP | 2014007862 A | 1/2014 |
| JP | 2014161217 A | 9/2014 |
| WO | 2013179394 A1 | 12/2013 |
| WO | 2014/103191 A1 | 7/2014 |

\* cited by examiner

ELECTRONIC APPARATUS CONFIGURED TO WIRELESSLY RECEIVE POWER FROM EXTERNAL APPARATUS

BACKGROUND OF THE INVENTION

Field of the Invention

The present invention relates to an electronic apparatus configured to wirelessly receive power from an external apparatus.

Description of the Related Art

In recent years, there has been known a power supply system including a power supply apparatus provided with a primary coil for wirelessly outputting power without being connected via a connector, and an electronic apparatus provided with a secondary coil for wirelessly receiving the power supplied from the power supply apparatus.

In such a power supply system, there has been known that the electronic apparatus charges a battery with use of the power received from the power supply apparatus via the secondary coil as discussed in Japanese Patent Application Laid-Open No. 2001-275266.

SUMMARY OF THE INVENTION

According to an aspect of the present invention, an electronic apparatus includes a power reception unit configured to wirelessly receive power from a power supply apparatus, a communication unit configured to receive a detection period, during which the power supply apparatus detect a foreign object, from the power supply apparatus and to notify a control unit of the detection period, and the control unit configured to perform a process for keeping power consumed by the electronic apparatus in predetermined range until the detection period has elapsed.

According to another aspect of the present invention, a method for controlling an electronic apparatus includes receiving power wirelessly from a power supply apparatus, communicating with the power supply apparatus for acquiring a detection period during which the power supply apparatus detects a foreign object, and performing a process for keeping power consumed by the electronic apparatus constant until the detection period has elapsed.

Further features of the present invention will become apparent from the following description of exemplary embodiments with reference to the attached drawings.

DESCRIPTION OF THE EMBODIMENTS

Figure 1:
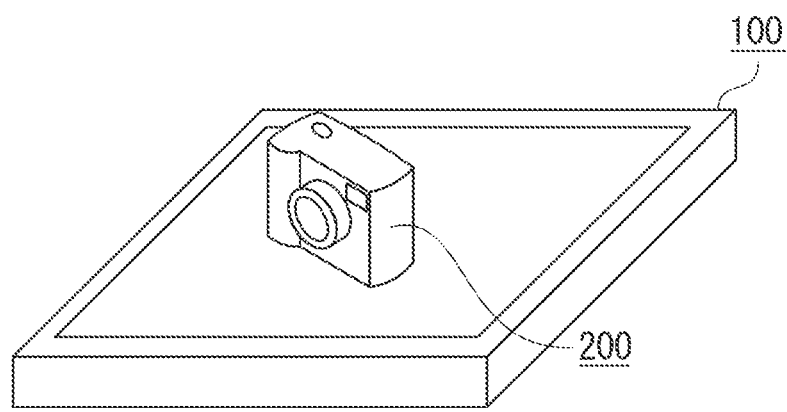
FIG. 1 illustrates an example of a power supply system according to a first exemplary embodiment.

In the following description, a first exemplary embodiment of the present invention will be described in detail with reference to the drawings. A power supply system according to the first exemplary embodiment includes a power supply apparatus 100 and an electronic apparatus 200, as illustrated in FIG. 1. In the power supply system according to the first exemplary embodiment, the power supply apparatus 100 wirelessly supplies power to the electronic apparatus 200, if the electronic apparatus 200 is located within a predetermined range. Further, the electronic apparatus 200 wirelessly receives the power output from the power supply apparatus 100, if located within the predetermined range. On the other hand, the electronic apparatus 200 cannot receive the power from the power supply apparatus 100, if not located within the predetermined range. The predetermined range is defined to be a range that allows the power supply apparatus 100 and the electronic apparatus 200 to communicate with each other. Further, the power supply apparatus 100 may wirelessly supply power to a plurality of electronic apparatuses.

The electronic apparatus 200 may be an imaging apparatus, such as a camera, or may be a reproduction apparatus that reproduces audio data and video data. Alternatively, the electronic apparatus 200 may be a communication apparatus, such as a mobile phone and a smartphone. Alternatively, the electronic apparatus 200 may be a battery pack including a battery 209. Alternatively, the electronic apparatus 200 may be an apparatus such as a vehicle that is driven by the power supplied from the power supply apparatus 100. Alternatively, the electronic apparatus 200 may be an apparatus that receives a television broadcast, a display that displays video data, or a personal computer. Further, the electronic apparatus 200 may be an apparatus that operates with use of the power supplied from the power supply apparatus 100 even without the battery 209 mounted thereon.

Figure 2:
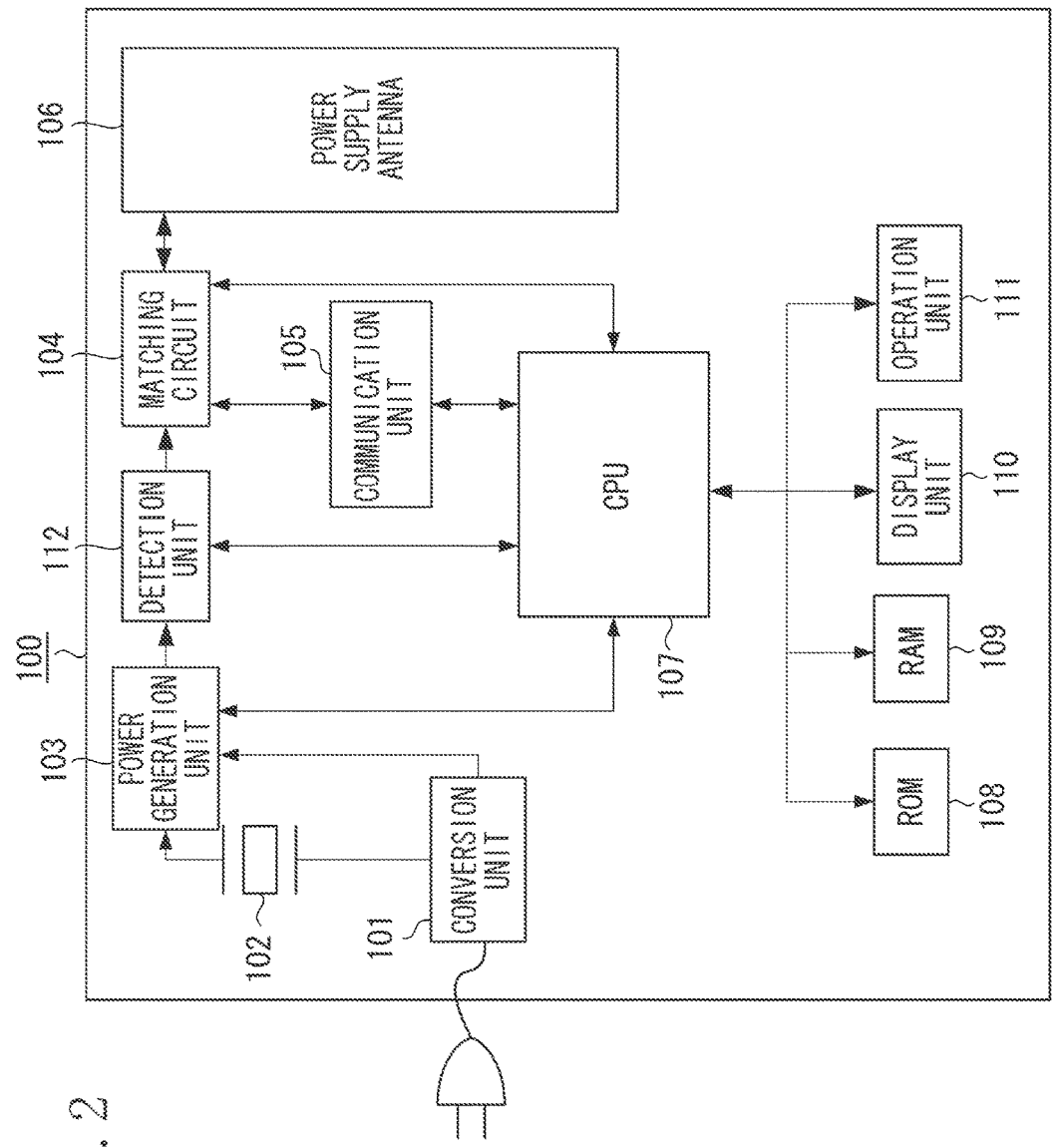
FIG. 2 is a block diagram illustrating an example of a power supply apparatus according to the first exemplary embodiment.

FIG. 2 is a block diagram illustrating an example of a configuration of the power supply apparatus 100. As illustrated in FIG. 2, the power supply apparatus 100 includes a conversion unit 101, an oscillator 102, a power generation unit 103, a matching circuit 104, a communication unit 105, a power supply antenna 106, a central processing unit (CPU) 107, a read only memory (ROM) 108, a random access memory (RAM) 109, a display unit 110, an operation unit 111, and a detection unit 112.

When an alternating-current (AC) power source (not illustrated) and the power supply apparatus 100 are connected to each other, the conversion unit 101 converts alternating-current power supplied from the AC power source (not illustrated) into direct-current power, and supplies the converted direct-current power to the power supply apparatus 100.

The oscillator 102 produces a frequency signal for use to control the power generation unit 103 so as to convert the power supplied from the conversion unit 101 into target power set by the CPU 107. A crystal oscillator or the like is used as the oscillator 102.

The power generation unit 103 generates power to be output to the outside via the power supply antenna 106 based on the power supplied from the conversion unit 101 and the frequency signal produced by the oscillator 102. The power generated by the power generation unit 103 is supplied to the matching circuit 104 via the detection unit 112.

The power generated by the power generation unit 103 includes first power and second power. The first power is power for use to allow the communication unit 105 to communicate with the electronic apparatus 200 via the power supply antenna 106. The second power is power for use to allow the electronic apparatus 200 to charge the battery 209 and perform a predetermined process. For example, the first power is power of 1 W or lower, and the second power is power of 2 W or higher. The first power is defined to be power lower than the second power. Further, the first power may be power specified in a communication standard of the communication unit 105. Further, the first power is not limited to the power of 1 W or lower. Further, the second power is not limited to the power of 2 W or higher as long as the second power is power usable to allow the electronic apparatus 200 to charge the battery 109 and to perform the predetermined process.

The matching circuit 104 is a resonance circuit for achieving resonance between the power supply antenna 106 and a power reception antenna 201 of the electronic apparatus 200. Further, the matching circuit 104 includes a circuit for achieving impedance matching between the power generation unit 103 and the power supply antenna 106. The matching circuit 104 includes a coil (not illustrated) and a capacitor (not illustrated).

When the power supply apparatus 100 outputs any one of the first power and the second power, the CPU 107 controls the matching circuit 104 so as to set a resonance frequency f of the power supply antenna 106 to a predetermined frequency to achieve the resonance between the power supply antenna 106 and the power reception antenna 201. At this time, the CPU 107 changes the resonance frequency f of the power supply antenna 106 by controlling a value of an inductance included in the matching circuit 104 and a value of the capacitor included in the matching circuit 104. Assume that the predetermined frequency is, for example, a frequency of 13.56 MHz.

The communication unit 105 performs, for example, close proximity wireless communication based on the Near Field Communication (NFC) standard defined by the NFC forum. When the first power is output from the power supply antenna 106, the communication unit 105 can transmit and receive data for wirelessly supplying the power to and from the electronic apparatus 200 via the power supply antenna 106. However, assume that the communication unit 105 does not communicate with the electronic apparatus 200 via the power supply antenna 106 while the second power is output from the power supply antenna 106. When the first power is output from the power supply antenna 106, the communication unit 105 transmits the data to the electronic apparatus 200 by superposing the data onto the first power. When transmitting the data to the power supply apparatus 100, the electronic apparatus 200 modulates a load inside the electronic apparatus 200, which causes a change in a current flowing in the power supply antenna 106. Therefore, the communication unit 105 can receive the data from the electronic apparatus 200 by detecting the current flowing in the power supply antenna 106, and analyzing that.

The data transmitted between the communication unit 105 and the electronic apparatus 200 is data in compliance with NFCData Exchange Format (NDEF).

The power supply antenna 106 is an antenna for outputting the power generated by the power generation unit 103 to the outside. The power supply apparatus 100 supplies the power to the electronic apparatus 200 via the power supply antenna 106, and transmits the data to the electronic apparatus 200 via the power supply antenna 106. Further, the power supply apparatus 100 receives the data from the electronic apparatus 200 via the power supply antenna 106.

The CPU 107 controls the power supply apparatus 100 by executing a computer program stored in the ROM 108. The CPU 107 controls the power to be supplied to the electronic apparatus 200 by controlling the power generation unit 103.

The ROM 108 stores information such as the computer program for controlling the power supply apparatus 100, and a parameter regarding the power supply apparatus 100.

The RAM 109 records the data acquired from the electronic apparatus 200 by the communication unit 105.

The display unit 110 displays video data provided from any one of the RAM 109 and the ROM 108. Further, the display unit 110 displays a warning to a user. The display unit 110 includes a light-emitting diode (LED) 113 or the like. The CPU 107 lights the LED 113 according to an operation performed by the power supply apparatus 100.

The operation unit 111 provides a user interface for operating the power supply apparatus 100. The operation unit 111 includes a power button of the power supply apparatus 100, a mode switching button of the power supply apparatus 100, and the like. Each of the buttons is constituted by a switch, a touch panel, or the like. The CPU 107 controls the power supply apparatus 100 according to an input signal input via the operation unit 111.

The detection unit 112 detects a voltage standing wave ratio (VSWR) to detect a resonance state between the power supply apparatus 100 and the electronic apparatus 200. Further, the detection unit 112 provides data indicating the detected VSWR to the CPU 107. The VSWR is a value indicating a relationship between a traveling wave of the power output from the power supply antenna 106 and a reflection wave of the power output from the power supply antenna 106. The CPU 107 can detect whether a foreign object is placed in the vicinity of the power supply apparatus 100 with use of the VSWR data provided from the detection unit 112.

Figure 3:
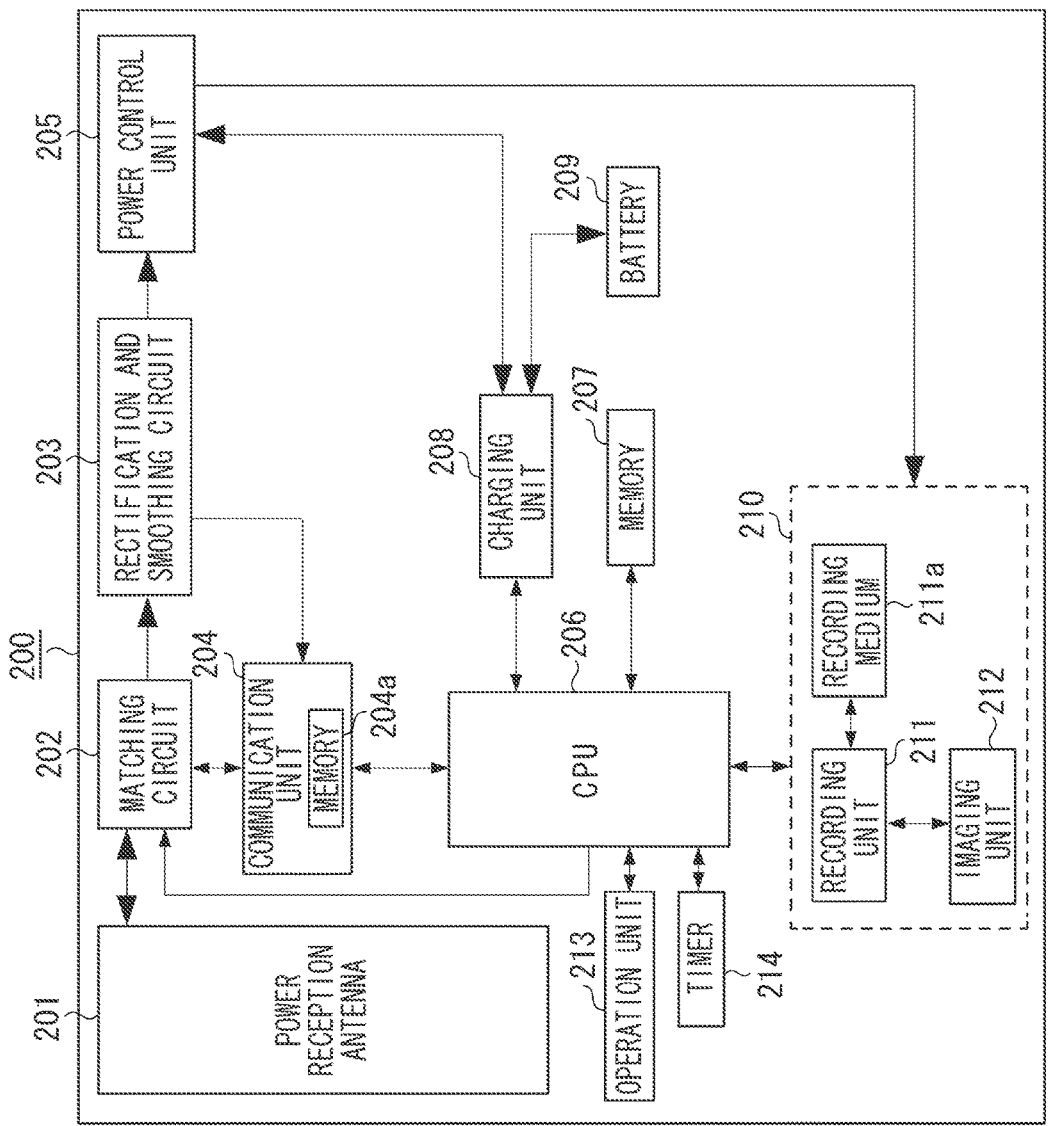
FIG. 3 is a block diagram illustrating an example of an electronic apparatus according to the first exemplary embodiment.

Next, an example of a configuration of the electronic apparatus 200 will be described with reference to FIG. 3. The electronic apparatus 200 includes the power reception antenna 201, a matching circuit 202, a rectification and smoothing circuit 203, a communication unit 204, a power control unit 205, a CPU 206, and a memory 207. Further, the electronic apparatus 200 includes a charging unit 208, the battery 209, a system 210, an operation unit 213, and a timer 214.

The power reception antenna 201 is an antenna for receiving the power supplied from the power supply apparatus 100. The electronic apparatus 200 receives the power from the power supply apparatus 100 via the power reception antenna 201. Further, the electronic apparatus 200 wirelessly communicates with the power supply apparatus 100 via the power reception antenna 201.

The matching circuit 202 is a resonance circuit for achieving the resonance between the power supply antenna 106 and the power reception antenna 201 according to a frequency equal to the resonance frequency f of the power supply antenna 106. Further, the matching circuit 202 includes a circuit for achieving impedance matching between the power reception antenna 201 and the rectification and smoothing circuit 203. The matching circuit 202 includes a coil (not illustrated) and a capacitor (not illustrated). The CPU 206 controls a value of the coil and a value of the capacitor included in the matching circuit 202 in such a manner that the power reception antenna 201 produces an oscillation with the frequency equal to the resonance frequency f of the power supply antenna 106. Further, the matching circuit 202 supplies the power received by the power reception antenna 201 to the rectification and smoothing circuit 203.

The rectification and smoothing circuit 203 removes a noise from the power supplied from the matching circuit 202, and generates direct-current power. Further, the rectification and smoothing circuit 203 supplies the generated direct-current power to the power control unit 205.

The communication unit 204 wirelessly communicates with an external apparatus, such as the power supply apparatus 100, according to the same communication standard as the communication unit 105. The communication unit 204 receives the data superposed on the first power from the power reception antenna 201. Further, the communication unit 204 analyzes the received data, and provides a result of the analysis of the data to the CPU 206. When the first power is supplied from the power supply apparatus 100 to the electronic apparatus 200, the communication unit 204 transmits response data as a response to the received data to the power supply apparatus 100. At this time, the communication unit 204 changes a load included in the communication unit 204 to transmit the response data as the response to the received data to the power supply apparatus 100. The communication unit 204 includes a memory 204a.

Figure 4:
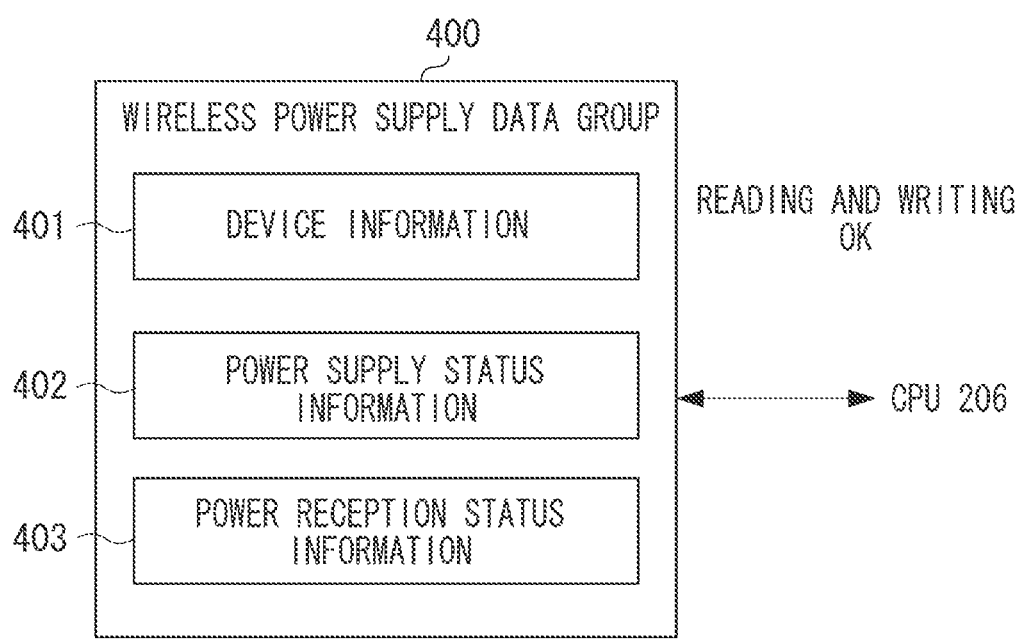
FIG. 4 is a diagram illustrating an example of wireless power supply data group according to the first exemplary embodiment.

The memory 204a stores a wireless power supply data group 400. FIG. 4 illustrates the wireless power supply data group 400. The wireless power supply data group 400 stores the data transmitted between the power supply apparatus 100 and the electronic apparatus 200. The wireless power supply data group 400 stores device information 401, power supply status information 402, and power reception status information 403. The device information 401, the power supply status information 402, and the power reception status information 403 are data in compliance with NDEF.

The device information 401 includes information for identifying the electronic apparatus 200, information for identifying a power supply method that the electronic apparatus 200 supports, and information indicating a power class of the electronic apparatus 200. Further, the device information 401 includes information indicating the number of power supply methods that the electronic apparatus 200 supports. Therefore, in a case where the electronic apparatus 200 supports a plurality of power supply methods, the device information 401 includes information indicating that the electronic apparatus 200 supports the plurality of power supply methods. Further, the device information 401 includes information indicating a response time, which is a time taken since the power reception status information 403 is requested from the power supply apparatus 100 until the electronic apparatus 200 transmits the power reception status information 403 to the power supply apparatus 100. The information indicating the power class of the electronic apparatus 200 is information indicating a maximum value of the power that the electronic apparatus 200 can receive from the power supply apparatus 100. For example, in a case where the maximum value of the power that the electronic apparatus 200 can receive from the power supply apparatus 100 is 1 W, information indicating that the electronic apparatus 200 supports a low power class is set as the information indicating the power class of the electronic apparatus 200. For example, in a case where the maximum value of the power that the electronic apparatus 200 can receive from the power supply apparatus 100 is 3 W, information indicating that the electronic apparatus 200 supports a middle power class is set as the information indicating the power class of the electronic apparatus 200. For example, in a case where the maximum value of the power that the electronic apparatus 200 can receive from the power supply apparatus 100 is 6 W, information indicating that the electronic apparatus 200 supports a high power class is set as the information indicating the power class of the electronic apparatus 200.

The device information 401 is information transmitted to the power supply apparatus 100 by the communication unit 204. Further, the device information 401 includes information indicating that any one of first process, second process, third process, fourth process, fifth process, and sixth process, which will be described below, is performed by the CPU 206 as a process for keeping the load constant. The device information 401 is fixed data stored in the memory 204a in advance.

The power supply status information 402 includes information indicating whether the power supply apparatus 100 starts or stops the wireless power supply to the electronic apparatus 200, and information indicating whether an error occurs in the power supply apparatus 100. The power supply status information 402 further includes first information. The first information is information regarding the foreign object detection. The first information includes information indicating whether the power supply apparatus 100 carries out the foreign object detection, information indicating a foreign object detection period that is a time period during which the power supply apparatus 100 carries out the foreign object detection, and information indicating a predetermined timing. The predetermined timing is a timing of starting a preparation process, which will be described below.

Further, the power supply status information 402 may include information indicating a time period during which the second power is output. Further, the power supply status information 402 includes information for identifying a power supply method that the power supply apparatus 100 supports, and information indicating the number of power supply methods that the power supply apparatus 100 supports. Further, the power supply status information 402 includes information indicating a power class of the power supply apparatus 100. The information indicating the power class of the power supply apparatus 100 is information indicating a maximum value of the power that the power supply apparatus 100 can output. For example, in a case where the maximum value of the power that the power supply apparatus 100 can output is 3 W, information indicating that the power supply apparatus 100 supports a low power class is set as the information indicating the power class of the power supply apparatus 100. For example, in a case where the maximum value of the power that the power supply apparatus 100 can output is 10 W, information indicating that the power supply apparatus 100 supports a middle power class is set as the information indicating the power class of the power supply apparatus 100. For example, in a case where the maximum value of the power that the power supply apparatus 100 can output is 20 W, information indicating that the power supply apparatus 100 supports a high power class is set as the information indicating the power class of the power supply apparatus 100.

The power supply status information 402 is information stored into the wireless power supply data group 400 in the memory 204a by the communication unit 105. After the power supply status information 402 is stored into the memory 204a, the CPU 206 can control the electronic apparatus 200 according to the power supply status information 402 by reading out the power supply status information 402.

The power reception status information 403 includes information indicating whether an error occurs in the electronic apparatus 200, and information indicating whether the electronic apparatus 200 requests the power supply apparatus 100 to supply the power. The power reception status information 403 may further include any one of information for requesting the power supply apparatus 100 to increase the power to be supplied to the electronic apparatus 200, and information for requesting the power supply apparatus 100 to reduce the power to be supplied to the electronic apparatus 200. The power reception status information 403 may further include information for requesting the power supply apparatus 100 to keep the power supplied to the electronic apparatus 200 at a present level. Further, the power reception status information 403 may further include information regarding a remaining capacity of the battery 209, and/or information regarding charging of the battery 209. Further, the power reception status information 403 may further include information indicating a temperature inside the electronic apparatus 200. The power reception status information 403 may further include information indicating whether the electronic apparatus 200 can perform the preparation process, which will be described below.

The power reception status information 403 is information stored into the wireless power supply data group 400 in the memory 204a by the CPU 206.

The communication unit 204 consumes lower power than the CPU 206. The communication unit 204 can communicate with the communication unit 105 with use of the power received from the power supply apparatus 100 by the power reception antenna 201 while the first power is output from the power supply apparatus 100.

The power control unit 205 performs control so as to cause the power supplied from any one of the rectification and smoothing circuit 203 and the battery 209 to be supplied to the electronic apparatus 200. The power control unit 205 supplies the power supplied from the power supply apparatus 100 via the rectification and smoothing circuit 203 to the electronic apparatus 200 according to an instruction from the CPU 206. The power control unit 205 supplies discharged power supplied from the battery 209 via the charging unit 208 to the electronic apparatus 200 according to an instruction from the CPU 206.

The CPU 206 controls the electronic apparatus 200 according to the result of the analysis of the data provided from the communication unit 204. Further, the CPU 206 controls the electronic apparatus 200 by executing a computer program stored in the memory 207.

The CPU 206 generates the power reception status information 403 according to information provided from each of the units of the electronic apparatus 200, deletes the power reception status information 403 stored in the memory 204a, and then stores the newly generated power reception status information 403 into the wireless power supply data group 400. Through this operation, the CPU 206 periodically updates the power reception status information 403.

The memory 207 stores the computer program for controlling the electronic apparatus 200. Further, the memory 207 records information regarding the electronic apparatus 200 and the like.

The charging unit 208 charges the battery 209 with use of the power supplied from the power control unit 205. Further, when no power is supplied from the power control unit 205, the charging unit 208 supplies the discharged power supplied from the battery 209 to the power control unit 205. The charging unit 208 periodically detects the information regarding the battery 209 and the information regarding the charging of the battery 209, and notifies the CPU 206 of the detected information.

The battery 209 is a battery attachable to and detachable from the electronic apparatus 200. Further, the battery 209 is a chargeable secondary battery.

The system 210 includes a recording unit 211 and an imaging unit 212.

The recording unit 211 records data such as image data and audio data provided from the imaging unit 212 into a recording medium 211a. Further, the recording unit 211 reads out the data such as the image data and the audio data from the recording medium 211a. The recording medium 211a may be a hard disk, a memory card, or the like, and may be built in the electronic apparatus 200 or may be an external recording medium detachably attached to the electronic apparatus 200.

The imaging unit 212 includes an image sensor for generating the image data from an optical image of an object, an image processing circuit that performs image processing on the image data generated by the image sensor, a compression and decompression circuit for compressing the image data and decompressing the compressed image data, and the like. The imaging unit 212 captures an image of the object, and provides the image data, such as a still image or a moving image, acquired from a result of the image capturing to the recording unit 211. The recording unit 211 records the image data provided from the imaging unit 212 into the recording medium 211a. The imaging unit 212 may further include a configuration required to capture an image of the object.

The system 210 includes a unit to which the power is supplied from the power control unit 205 while the electronic apparatus 200 is powered on. Therefore, the system 210 may further include a display unit for displaying the image data, a unit for transmitting and receiving an electronic mail, and/or the like in addition to the recording unit 211, the recording medium 211a, and the imaging unit 212.

The operation unit 213 is a user interface for operating the electronic apparatus 200. The operation unit 213 includes a power button for operating the electronic apparatus 200, a mode switching button for switching a mode of the electronic apparatus 200, and the like. Each of the buttons is constituted by a switch, a touch panel, or the like. When being operated by the user, the operation unit 213 provides a signal corresponding to the operation performed by the user to the CPU 206. The operation unit 213 may control the electronic apparatus 200 according to a remote signal received from a not-illustrated remote controller.

The timer 214 measures a time regarding a process performed by each of the units of the electronic apparatus 200.

Further, each of the power supply antenna 106 and the power reception antenna 201 may be a helical antenna or a loop antenna, or may be a planar antenna, such as a meander line antenna.

In the first exemplary embodiment, the power supply apparatus 100 is configured to wirelessly supply the power to the electronic apparatus 200 based on the magnetic resonance method, but the method for wirelessly supplying the power is not limited thereto.

For example, the power supply apparatus 100 may be configured to wirelessly supply the power to the electronic apparatus 200 based on capacitive coupling, instead of the magnetic resonance method. In this case, an electrode should be mounted on each of the power supply apparatus 100 and the electronic apparatus 200, and the power is wirelessly supplied from the electrode of the power supply apparatus 100 to the electrode of the electronic apparatus 200.

Alternatively, for example, the power supply apparatus 100 may be configured to wirelessly supply the power to the electronic apparatus 200 based on electromagnetic induction, instead of the magnetic resonance method.

The power supply apparatus 100 is configured to wirelessly supply the power to the electronic apparatus 200. However, the term "wirelessly" may be replaced with a phrase "in a non-contact manner" or a phrase "in a contactless manner".

Figure 5:
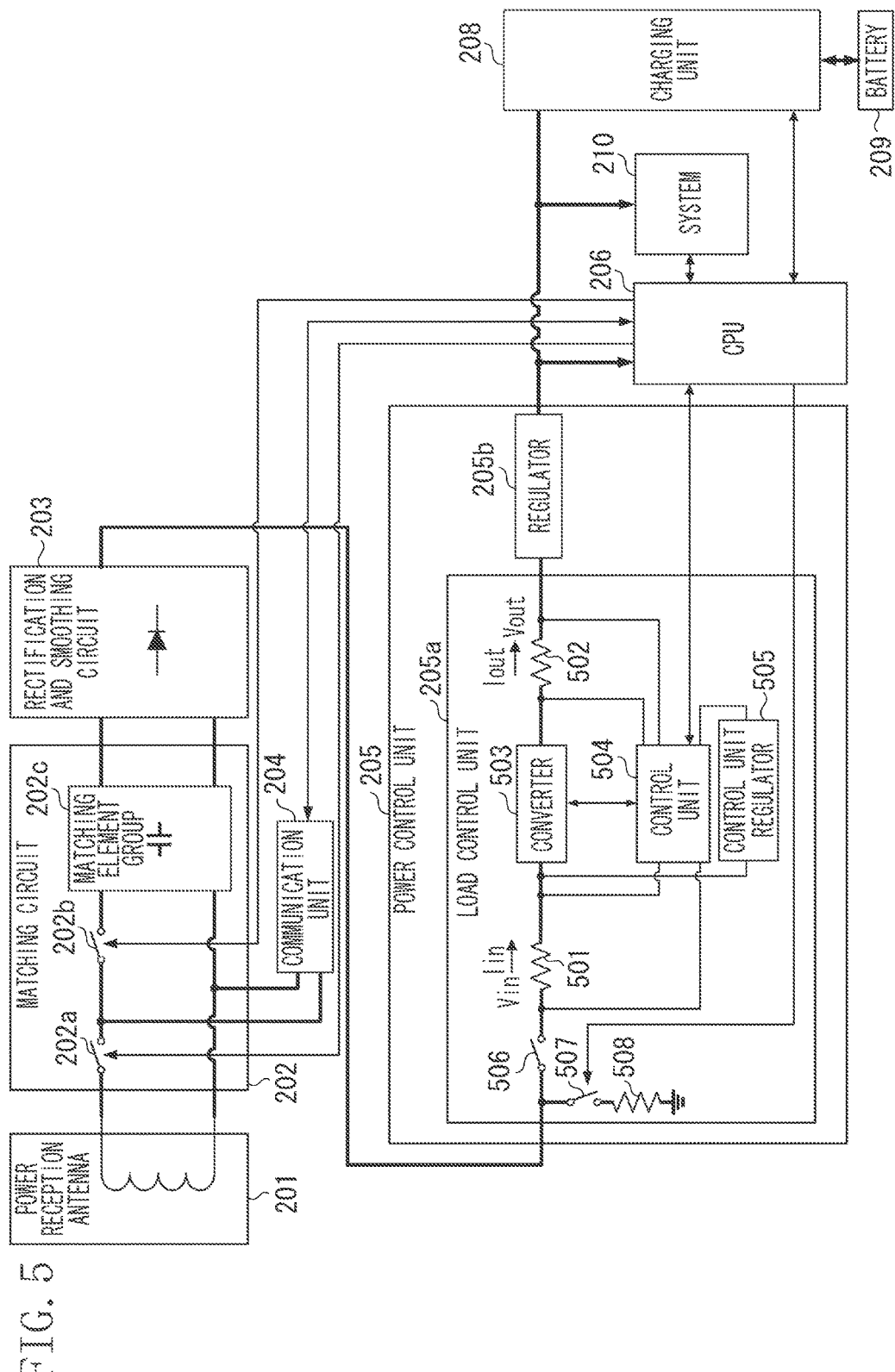
FIG. 5 is a diagram illustrating an example of a power control unit according to the first exemplary embodiment.

Next, an example of a configuration of the power control unit 205 of the electronic apparatus 200 will be described with reference to FIG. 5.

The matching circuit 202 includes a switch 202a, a switch 202b, and a matching element group 202c. Each of the switch 202a and the switch 202b is, for example, a switch constituted by a field-effect transistor (FET) or the like. The switch 202a and the switch 202b are controlled by the CPU 206. The matching element group 202c includes a matching element such as a capacitor connected in parallel or series with the power reception antenna 201. The matching element group 202c is a circuit that adjusts matching between the power reception antenna 201 and the matching circuit 202.

The power control unit 205 includes a load control unit 205a and a regulator 205b. The load control unit 205a includes an input current detection resistor 501, an output current detection resistor 502, a converter 503, a control unit 504, a control unit regulator 505, a switch 506, a switch 507, and a dummy resistor 508.

The input current detection resistor 501 is a resistor for detecting an input current Iin input from the rectification and smoothing circuit 203 to the load control unit 205a of the power control unit 205. The control unit 504 detects the input current Iin by detecting a voltage of the input current detection resistor 501.

The output current detection resistor 502 is a resistor for detecting an output current Iout to be output from the load control unit 205a to the regulator 205b. The control unit 504 detects the output current Iout by detecting a voltage of the output current detection resistor 502.

The converter 503 is, for example, a direct current to direct current (DC-to-DC) converter. The converter 503 converts an input voltage Vin input to the converter 503 into an output voltage Vout, and outputs the converted voltage Vout to the regulator 205b. The converter 503 converts the input voltage Vin into the output voltage Vout according to an instruction from the control unit 504. The output voltage Vout output from the converter 503 may be a voltage equal to or higher than the input voltage Vin, or may be a voltage lower than the input voltage Vin. The control unit 504 can control the output voltage Vout output from the converter 503 by controlling a duty ratio of the converter 503. Therefore, the control unit 504 can control an impedance of the load of the electronic apparatus 200 by controlling the output voltage Vout output from the converter 503.

The control unit 504 controls the entire load control unit 205a. The control unit 504 includes a CPU that consumes power lower than power consumed by the CPU 206 and power consumed to charge the battery 209. The control unit 504 can detect the input current Iin, the output current Iout, the input voltage Vin, and the output voltage Vout. Further, the control unit 504 can detect an impedance Zin of the load control unit 205a with use of the input current Iin and the input voltage Vin. The control unit 504 controls the converter 503 so as to match the detected impedance Zin with a predetermined impedance. The predetermined impedance is a fixed value used to allow the power supply apparatus 100 to detect a foreign object highly accurately. For example, if the impedance Zin is higher than the predetermined impedance, the control unit 504 controls the converter 503 so as to increase the input current Iin so that the impedance Zin matches the predetermined impedance. In this case, the converter 503 increases the output voltage Vout, which causes an increase in the input current Iin. On the other hand, for example, if the impedance Zin is lower than the predetermined impedance, the control unit 504 controls the converter 503 so as to reduce the input current Iin so that the impedance Zin matches the predetermined impedance. In this case, the converter 503 reduces the output voltage Vout, which causes a reduction in the input current Iin.

The control unit regulator 505 is, for example, a linear regulator. The control unit regulator 505 supplies a voltage required for the operation of the control unit 504 to the control unit 504.

Each of the switch 506 and the switch 507 is, for example, a switch constituted by an FET or the like. The switch 506 and the switch 507 are controlled by the CPU 206.

The dummy resistor 508 is a resistor for consuming the power supplied from the rectification and smoothing circuit 203.

The regulator 205b is, for example, a switching regulator. The regulator 205b converts the voltage supplied from the load control unit 205a, and supplies the converted voltage to at least one of the CPU 206, the system 210, and the charging unit 208.

Next, the process for keeping the load constant will be described with reference to FIG. 5. The CPU 206 can perform at least one of the first process, the second process, the third process, the fourth process, the fifth process, and the sixth process as the process for keeping the load constant.

The first process is a process in which the CPU 206 switches off the switch 202a. When the first process is performed, the power reception antenna 201 and the matching circuit 202 are disconnected from each other. Therefore, when the first process is performed, the power received by the power reception antenna 201 stops being supplied to the power control unit 205, the charging unit 208, the system 210, and the battery 209 via the rectification and smoothing circuit 203. Further, when the first process is performed, the power received by the power reception antenna 201 stops being supplied to the communication unit 204.

The second process is a process in which the CPU 206 switches on the switch 202a, and switches off the switch 202b. When the second process is performed, the power reception antenna 201 and the matching circuit 202 are disconnected from each other. Therefore, when the second process is performed, the power received by the power reception antenna 201 stops being supplied to the power control unit 205, the charging unit 208, the system 210, and the battery 209 via the rectification and smoothing circuit 203. However, when the second process is performed, the power reception antenna 201 and the communication unit 204 remain connected to each other, whereby the communication unit 204 can communicate with the power supply apparatus 100.

The third process is a process in which the CPU 206 switches on the switch 202a and the switch 202b, and switches off the switch 506 and the switch 507. When the third process is performed, the rectification and smoothing circuit 203 and the power control unit 205 are disconnected from each other. Therefore, when the third process is performed, the power received by the power reception antenna 201 stops being supplied to the charging unit 208, the system 210, and the battery 209 via the power control unit 205. However, when the third process is performed, the power reception antenna 201 and the communication unit 204 remain connected to each other, whereby the communication unit 204 can communicate with the power supply apparatus 100.

The fourth process is a process in which the CPU 206 switches on the switch 202a, the switch 202b, and the switch 507, and switches off the switch 506. When the fourth process is performed, the power supplied from the rectification and smoothing circuit 203 is consumed by the dummy resistor 508. When the fourth process is performed, the power received by the power reception antenna 201 stops being supplied to the charging unit 208, the system 210, and the battery 209 via the power control unit 205. However, when the fourth process is performed, the power reception antenna 201 and the communication unit 204 remain connected to each other, whereby the communication unit 204 can communicate with the power supply apparatus 100. When the fourth process is performed, the power supplied from the rectification and smoothing circuit 203 is consumed by the dummy resistor 508, whereby the load of the electronic apparatus 200 substantially corresponds to an impedance of the dummy resistor 508.

The fifth process includes a process in which the CPU 206 switches on the switch 202a, the switch 202b, and the switch 506, and switches off the switch 507, and a process in which the CPU 206 causes the control unit 504 to control the converter 503. When the fifth process is performed, the control unit 504 controls the converter 503 so as to match the impedance Zin with the predetermined impedance. Therefore, the load of the electronic apparatus 200 is controlled so as to be kept constant by the control unit 504. When the fifth process is performed, the power reception antenna 201 and the communication unit 204 remain connected to each other, whereby the communication unit 204 can communicate with the power supply apparatus 100. When the fifth process is performed, the electronic apparatus 200 can supply the power to at least one of the charging unit 208, the system 210, and the battery 209 from the rectification and smoothing circuit 203.

The sixth process is a process in which the CPU 206 stops the operation of the charging unit 208, and the operation of the system 210. When the sixth process is performed, this leads to a reduction in power consumed by the charging unit 208 and the system 210, whereby the load of the electronic apparatus 200 is controlled so as to be kept constant by the CPU 206. When the sixth process is performed, the power reception antenna 201 and the communication unit 204 remain connected to each other, whereby the communication unit 204 can communicate with the power supply apparatus 100. Assume that, when the sixth process is performed, the power is supplied from the rectification and smoothing circuit 203 to the CPU 206.

(Power Supply Process)

Figure 6:
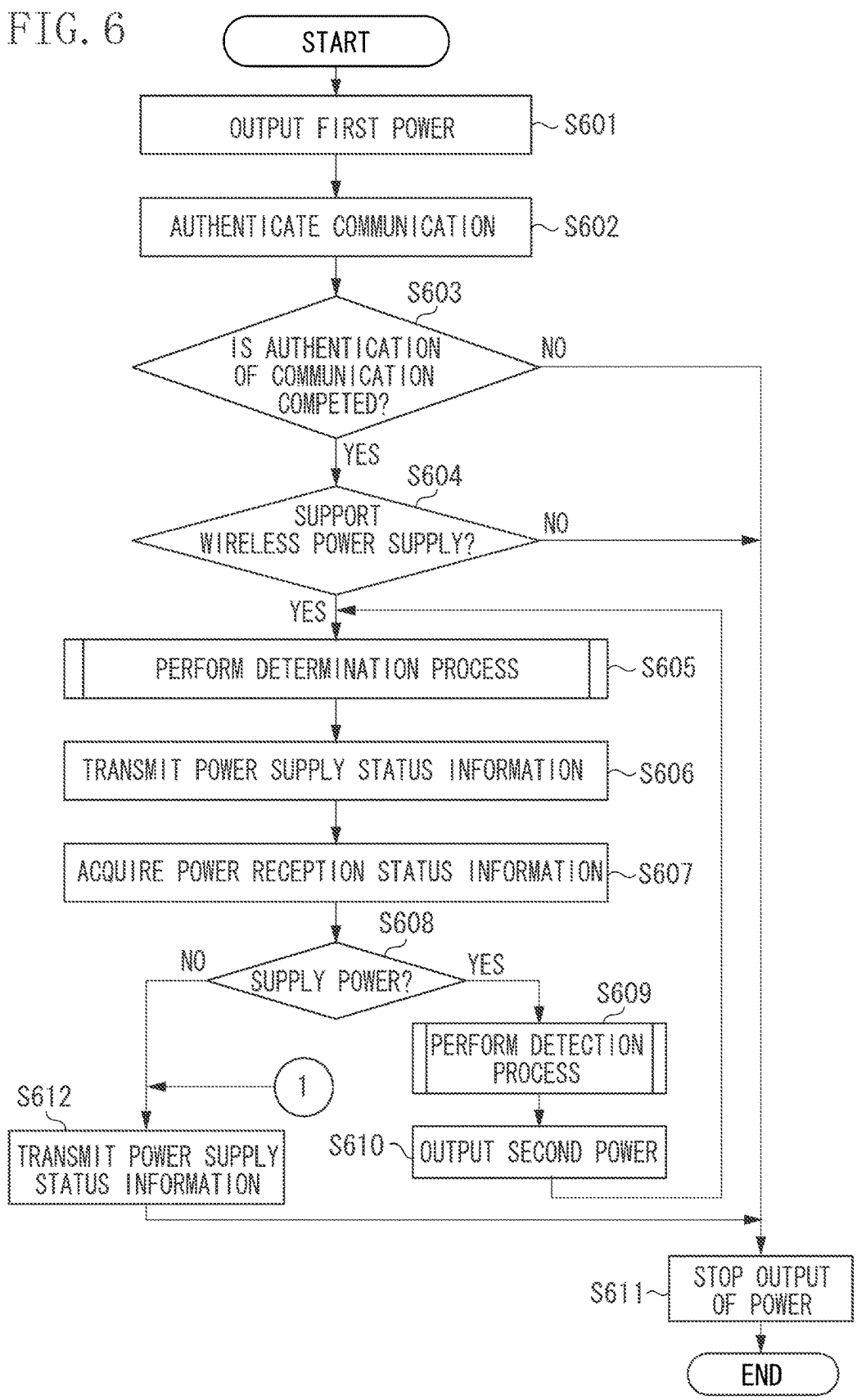
FIG. 6 is a flowchart illustrating an example of a power supply process according to the first exemplary embodiment.

Next, a power supply process performed by the CPU 107 according to the first exemplary embodiment will be described with reference to a flowchart illustrated in FIG. 6. The CPU 107 executes the computer program stored in the ROM 108, by which the power supply process can be realized.

When the power supply apparatus 100 is powered on, in step S601, the CPU 107 controls at least one of the oscillator 102, the power generation unit 103, and the matching circuit 104 so as to output the first power via the power supply antenna 106. Then, the process proceeds to step S602.

In step S602, the CPU 107 causes the communication unit 105 to carry out authentication for wirelessly communicating with the communication unit 204. Then, the process proceeds to step S603.

In step S603, the CPU 107 determines whether the authentication for wirelessly communicating with the communication unit 204 is completed. If the authentication for wirelessly communicating with the communication unit 204 is completed (YES in step S603), the process proceeds to step S604. If the authentication for wirelessly communicating with the communication unit 204 is not completed (NO in step S603), the process proceeds to step S611.

In step S604, the CPU 107 determines whether the electronic apparatus 200 supports the wireless power supply. For example, the CPU 107 controls the communication unit 105 so as to transmit data for acquiring the device information 401 to the electronic apparatus 200. When the device information 401 is received by the communication unit 105, the CPU 107 determines whether the electronic apparatus 200 supports the wireless power supply with use of the device information 401 received by the communication unit 105. If the electronic apparatus 200 supports the wireless power supply (YES in step S604), the process proceeds to step S605. If the electronic apparatus 200 does not support the wireless power supply (NO in step S604), the process proceeds to step S611.

In step S605, the CPU 107 performs a determination process for determining whether to perform a detection process, which is a process for detecting a foreign object. The detection process and the determination process will be described below. When performing the determination process, the CPU 107 determines whether the power supply apparatus 100 will carry out the foreign object detection. Then, the process proceeds to step S606.

In step S606, the CPU 107 generates the power supply status information 402, and controls the communication unit 105 so as to transmit the generated power supply status information 402 to the electronic apparatus 200. The power supply status information 402 generated by the CPU 107 in step S606 includes information indicating that the power supply apparatus 100 will start the wireless power supply to the electronic apparatus 200, information indicating that no error occurs in the power supply apparatus 100, and the first information. If the CPU 107 determines to perform the detection process (YES in step S701), the first information transmitted to the electronic apparatus 200 in step S606 includes information indicating that the power supply apparatus 100 will carry out the foreign object detection, the information indicating the foreign object detection period, and the information indicating the predetermined timing. If the CPU 107 determines not to perform the detection process (NO in step S701), the first information transmitted to the electronic apparatus 200 in step S606 includes information indicating that the power supply apparatus 100 will not carry out the foreign object detection.

Upon the transmission of the power supply status information 402 by the communication unit 105, the process proceeds to step S607. The power supply status information 402 transmitted by the communication unit 105 is stored into the wireless power supply data group 400 in the memory 204*a*.

Upon receiving the power supply status information 402, the communication unit 204 stores the power supply status information 402 received from the power supply apparatus 100 into the wireless power supply data group 400 in the memory 204*a*. At this time, the communication unit 204 notifies the CPU 206 that the power supply status information 402 is received.

In step S607, the CPU 107 controls the communication unit 105 so as to transmit data for requesting the power reception status information 403 to the electronic apparatus 200. After that, the communication unit 105 receives the power reception status information 403 from the electronic apparatus 200. Upon the acquisition of the power reception status information 403 from the electronic apparatus 200, the process proceeds to step S608.

In step S608, the CPU 107 controls whether to supply the power to the electronic apparatus 200 with use of the power reception status information 403 acquired from the electronic apparatus 200 in step S607. For example, if the power reception status information 403 includes information indicating that the electronic apparatus 200 does not request the power supply apparatus 100 to supply the power, the CPU 107 determines not to supply the power to the electronic apparatus 200. If the power reception status information 403 includes information indicating that the battery 209 is fully charged, the CPU 107 determines not to supply the power to the electronic apparatus 200. If the power reception status information 403 includes information indicating that an error occurs in the electronic apparatus 200, the CPU 107 determines not to supply the power to the electronic apparatus 200. If the power reception status information 403 includes information indicating that the electronic apparatus 200 requests the power supply apparatus 100 to supply the power, the CPU 107 determines to supply the power to the electronic apparatus 200. If the power reception status information 403 includes information indicating that the battery 209 is not fully charged, the CPU 107 determines to supply the power to the electronic apparatus 200. If the power reception status information 403 includes information indicating that no error occurs in the electronic apparatus 200, the CPU 107 determines to supply the power to the electronic apparatus 200.

If the CPU 107 determines to supply the power to the electronic apparatus 200 (YES in step S608) after determining that the power supply apparatus 100 will not carry out the foreign object detection (NO in step S701) by the determination process in step S605, the process proceeds to step S610. If the CPU 107 determines to supply the power to the electronic apparatus 200 (YES in step S608) after determining that the power supply apparatus 100 will carry out the foreign object detection (YES in step S701) by the determination process in step S605, the process proceeds to step S609. If the CPU 107 determines not to supply the power to the electronic apparatus 200 (NO in step S608), the process proceeds to step S612. In step S609, the CPU 107 performs the detection process for determining whether there is a foreign object within the predetermined range. The detection process will be described below. If the detection process is performed, the CPU 107 can determine whether there is a foreign object within the predetermined range. Then, the process proceeds to step S610.

In step S610, the CPU 107 controls at least one of the oscillator 102, the power generation unit 103, and the matching circuit 104 so as to supply the second power via the power supply antenna 106. In step S610, the CPU 107 sets a magnitude of the second power to be output via the power supply antenna 106 with use of at least one of the device information 401 and the power reception status information 403. After the power supply period has elapsed since the start of the output of the second power, the CPU 107 controls at least one of the oscillator 102, the power generation unit 103, and the matching circuit 104 so as to switch the power to be output via the power supply antenna 106 from the second power to the first power. After that, the process returns to step S605. The power supply period is the time period during which the power supply apparatus 100 outputs the power that allows the electronic apparatus 200 to charge the battery 209 to the electronic apparatus 200. The power supply period may be set by the CPU 107, or may be predetermined. The CPU 107 may be configured to set the power supply time with use of the device information 401 acquired from the electronic apparatus 200. Upon the start of the output of the second power in step S610, the CPU 107 notifies the user that the power supply apparatus 100 is supplying the power to the electronic apparatus 200 by lighting the LED 113. Alternatively, upon the start of the output of the second power, the CPU 107 may notify the user that the power supply apparatus 100 is supplying the power to the electronic apparatus 200 by controlling the display unit 110. After the start of the output of the second power, the process returns to step S605.

In step S611, the CPU 107 controls at least one of the oscillator 102, the power generation unit 103, and the matching circuit 104 so as to stop the output of the power via the power supply antenna 106. Then, the process ends.

In step S612, the CPU 107 generates the power supply status information 402, and controls the communication unit 105 so as to transmit the generated power supply status information 402 to the electronic apparatus 200. The power supply status information 402 generated by the CPU 107 in step S612 includes information indicating that the power supply apparatus 100 will stop the wireless power supply to the electronic apparatus 200. If an error occurs in the power supply apparatus 100, the power supply status information 402 generated by the CPU 107 in step S612 further includes information indicating that an error occurs in the power supply apparatus 100.

Upon the transmission of the power supply status information 402 by the communication unit 105, the process proceeds to step S611. When the power supply status information 402 is transmitted by the communication unit 105, the CPU 107 notifies the user that the power supply from the power supply apparatus 100 to the electronic apparatus 200 is completed by lighting the LED 113. Alternatively, the CPU 107 may notify the user that the power supply from the power supply apparatus 100 to the electronic apparatus 200 is completed by controlling the display unit 110.

(Determination Process)

Figure 7:
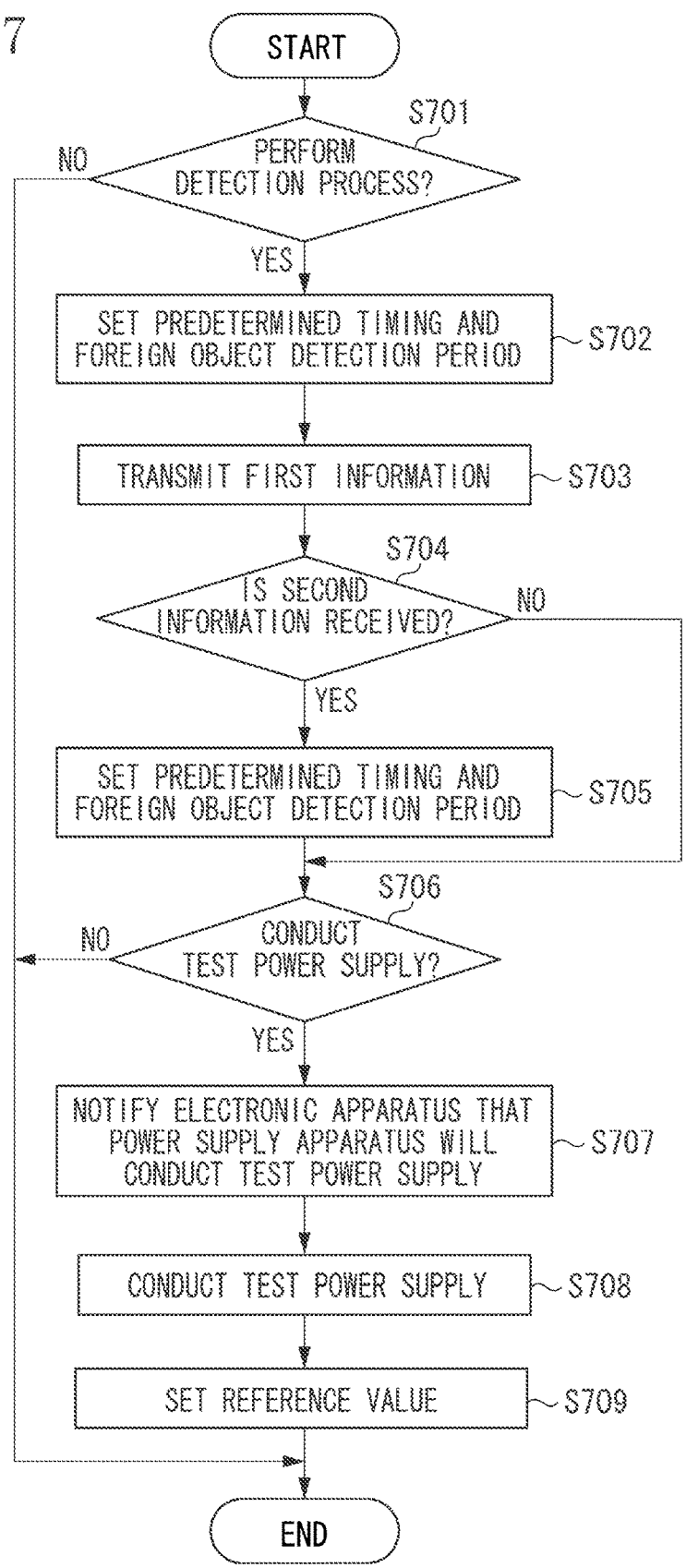
FIG. 7 is a flowchart illustrating an example of a determination process according to the first exemplary embodiment.

Next, the determination process performed by the CPU 107 in step S605 illustrated in FIG. 6 will be described with reference to a flowchart illustrated in FIG. 7. The CPU 107 executes the computer program stored in the ROM 108, by which the determination process can be realized.

In step S701, the CPU 107 determines whether to perform the detection process, which will be described below. For example, the CPU 107 determines whether to perform the detection process with use of the device information 401 acquired from the electronic apparatus 200. Alternatively, for example, the CPU 107 may determine whether to perform the detection process, which will be described below, with use of the power reception status information 403 acquired from the electronic apparatus 200. If the CPU 107 determines to perform the detection process, which will be described below (YES in step S701), the process proceeds to step S702. If the CPU 107 determines not to perform the detection process, which will be described below, (NO in step S701), the process exits the flowchart illustrated in FIG. 7, and then proceeds to step S606 illustrated in FIG. 6.

In step S702, the CPU 107 sets the foreign object detection period and the predetermined timing. For example, if the device information 401 includes information indicating that the CPU 206 will perform any one of the first process, the second process, the third process, the fourth process, and the sixth process, the CPU 107 sets the foreign object detection period to "30 seconds". Further, in this case, the CPU 107 sets the predetermined timing to a "timing after completion of the transmission of the power supply status information 402 and the reception of the power reception status information 403". This setting causes the electronic apparatus 200 to perform the preparation process, which will be described below, after the completion of the transmission of the power supply status information 402 and the reception of the power reception status information 403 and before the output of the second power. This arrangement allows the power supply apparatus 100 to determine whether there is a foreign object within the predetermined range, and control the wireless power supply to the electronic apparatus 200 according to a result of the determination before the output of the second power.

On the other hand, for example, if the device information 401 includes information indicating that the CPU 206 will perform the fifth process, the CPU 107 sets the foreign object detection period in such a manner that this period coincides with the power supply period. Further, in this case, the CPU 107 sets the predetermined timing to a "timing at which the output of the second power is started". This setting causes the electronic apparatus 200 to perform the preparation process, which will be described below, while the second power is output. When the foreign object detection period is set so as to coincide with the power supply period, and the predetermined timing is set to the "timing at which the output of the second power is started", the CPU 107 performs the process of step S609 and the process of step S610 in parallel with each other. This arrangement allows the power supply apparatus 100 to determine whether there is a foreign object within the predetermined range, and control the wireless power supply to the electronic apparatus 200 according to the result of the determination while the second power is output.

Alternatively, the CPU 107 may set the foreign object detection period and the predetermined timing with use of the power reception status information 403. Alternatively, the CPU 107 may set the foreign object detection period and the predetermined timing according to the magnitude of the power to be output from the power supply antenna 106. Upon these settings, the process proceeds to step S703.

In step S703, the CPU 107 generates the first information, and controls the communication unit 105 so as to transmit the generated first information to the electronic apparatus 200. In step S703, the CPU 107 generates the information indicating that the power supply apparatus 100 will carry out the foreign object detection, the information indicating the foreign object detection period determined in step S702, and the information indicating the predetermined timing determined in step S702. Upon the generation of the first information, the process proceeds to step S704.

In step S704, the CPU 107 determines whether second information is received from the electronic apparatus 200 by the communication unit 105. When the first information transmitted to the electronic apparatus 200 in step S703 is received by the electronic apparatus 200, the electronic apparatus 200 determines whether to change at least one of the foreign object detection period and the predetermined timing that the electronic apparatus 200 is notified of from the power supply apparatus 100. If the electronic apparatus 200 changes at least one of the foreign object detection period and the predetermined timing that the electronic apparatus 200 is notified of from the power supply apparatus 100, the electronic apparatus 200 transmits the second information to the power supply apparatus 100. The second information includes information indicating at least one of the foreign object detection period and the predetermined timing changed by the electronic apparatus 200. If the electronic apparatus 200 does not change the foreign object detection period and the predetermined timing that the electronic apparatus 200 is notified of from the power supply apparatus 100, the electronic apparatus 200 does not transmit the second information to the power supply apparatus 100.

If the second information is received from the electronic apparatus 200 (YES in step S704), the process proceeds to step S705. If the second information is not received from the electronic apparatus 200 (NO in step S704), the process proceeds to step S706.

In step S705, the CPU 107 sets the foreign object detection period and the predetermined timing with use of the second information. Upon these settings, the process proceeds to step S706.

In step S706, the CPU 107 determines whether to conduct a test power supply to the electronic apparatus 200. The test power supply is a power supply for setting a reference value for use to detect a foreign object into the RAM 109. If the reference value is set in the RAM 109 in advance, the CPU 107 determines not to conduct the test power supply (NO in step S706). Then, the process exits the flowchart illustrated in FIG. 7, and then proceeds to step S606 illustrated in FIG. 6. If the reference value is not set in the RAM 109 in advance, the CPU 107 determines to conduct the test power supply (YES in step S706). Then, the process proceeds to step S707.

In step S707, the CPU 107 controls the communication unit 105 so as to transmit, to the electronic apparatus 200, information for notifying the electronic apparatus 200 that the power supply apparatus 100 will conduct the test power supply. Upon this transmission, the process proceeds to step S708.

In step S708, the CPU 107 controls at least one of the oscillator 102, the power generation unit 103, and the matching circuit 104 so as to conduct the test power supply to the electronic apparatus 200. The test power supply is, for example, a process for outputting the first power to the electronic apparatus 200 via the power supply antenna 106. Upon this execution of the test power supply, the process proceeds to step S709.

In step S709, the CPU 107 acquires information indicating the VSWR that the CPU 107 is notified of from the detection unit 112 when the process of step S708 is performed, and sets a value of the VSWR that the CPU 107 is notified of from the detection unit 112 as the reference value. At this time, the CPU 107 sets the reference value into the RAM 109. Upon this setting, the CPU 107 controls at least one of the oscillator 102, the power generation unit 103, and the matching circuit 104 so as to stop the test power supply. After that, the process exits the flowchart illustrated in FIG. 7, and then proceeds to step S606 illustrated in FIG. 6.

(Detection Process)

Next, the detection process performed by the CPU 107 in step S609 illustrated in FIG. 6 will be described with reference to a flowchart illustrated in FIG. 8. The CPU 107 executes the computer program stored in the ROM 108, by which the detection process can be realized.

In step S801, the CPU 107 controls at least one of the oscillator 102, the power generation unit 103, and the matching circuit 104 so as to output the first power via the power supply antenna 106. Further, the CPU 107 controls the detection unit 112 so as to start the detection of the VSWR used to determine whether there is a foreign object within the predetermined range.

A foreign object may be placed in advance within the predetermined range when the process of step S801 is performed. Therefore, if the power supply apparatus 100 supplies high power to the electronic apparatus 200 as the power for detecting a foreign object, this may result in supply of excessive power to the foreign object and the electronic apparatus 200. To prevent such an excessive power supply, in step S801, the CPU 107 performs control so as to output the first power, which is expected to be not excessive power for the electronic apparatus 200 and the foreign object, to the electronic apparatus 200. Then, the process proceeds to step S802.

In step S802, the CPU 107 determines whether there is a foreign object within the predetermined range. For example, the CPU 107 determines whether there is a foreign object within the predetermined range with use of the information indicating the VSWR that is provided from the detection unit 112. In this case, if a difference between the VSWR detected by the detection unit 112 and the reference value is a first value or larger, the CPU 107 determines that there is a foreign object within the predetermined range. The first value is a value corresponding to an amount by which the VSWR is assumed to change when a foreign object is placed within the predetermined range. In this case, if the difference between the VSWR detected by the detection unit 112 and the reference value is not the first value or larger, the CPU 107 determines that there is no foreign object within the predetermined range. If the CPU 107 determines that there is a foreign object within the predetermined range (YES in step S802), the process proceeds to step S803. If the CPU 107 determines that there is no foreign object within the predetermined range (NO in step S802), the process proceeds to step S804. The reference value used in step S802 is the reference value set in the RAM 109 in advance, or the reference value set into the RAM 109 in step S709.

In step S803, the CPU 107 notifies the user that a foreign object is detected by lighting the LED 113. Alternatively, the CPU 107 may notify the user that a foreign object is detected by controlling the display unit 110. Then, the process proceeds to step S612 in the power supply process illustrated in FIG. 6. After determining that there is a foreign object within the predetermined range (YES in step S802), in step S612, the CPU 107 controls the communication unit 105 so as to transmit, to the electronic apparatus 200, the power supply status information 402 including the information indicating that a foreign object is detected.

In step S804, the CPU 107 determines whether the foreign object detection period has elapsed since the detection unit 112 has been controlled so as to start the detection of the VSWR. If the foreign object detection period has elapsed since the detection unit 112 has been controlled so as to start the detection of the VSWR (YES in step S804), the process exits the flowchart illustrated in FIG. 8, and then proceeds to step S610 in the power supply process illustrated in FIG. 6. If the foreign object detection period has elapsed since the detection unit 112 has been controlled so as to start the detection of the VSWR (YES in step S804), the CPU 107 controls the detection unit 112 so as to stop the detection of the VSWR. If the foreign object detection period has not elapsed since the detection unit 112 has been controlled so as to start the detection of the VSWR (NO in step S804), the process returns to step S802. The foreign object detection period in step S804 corresponds to the foreign object detection period included in the power supply status information 402 transmitted to the electronic apparatus 200 in step S606.

Figure 8:
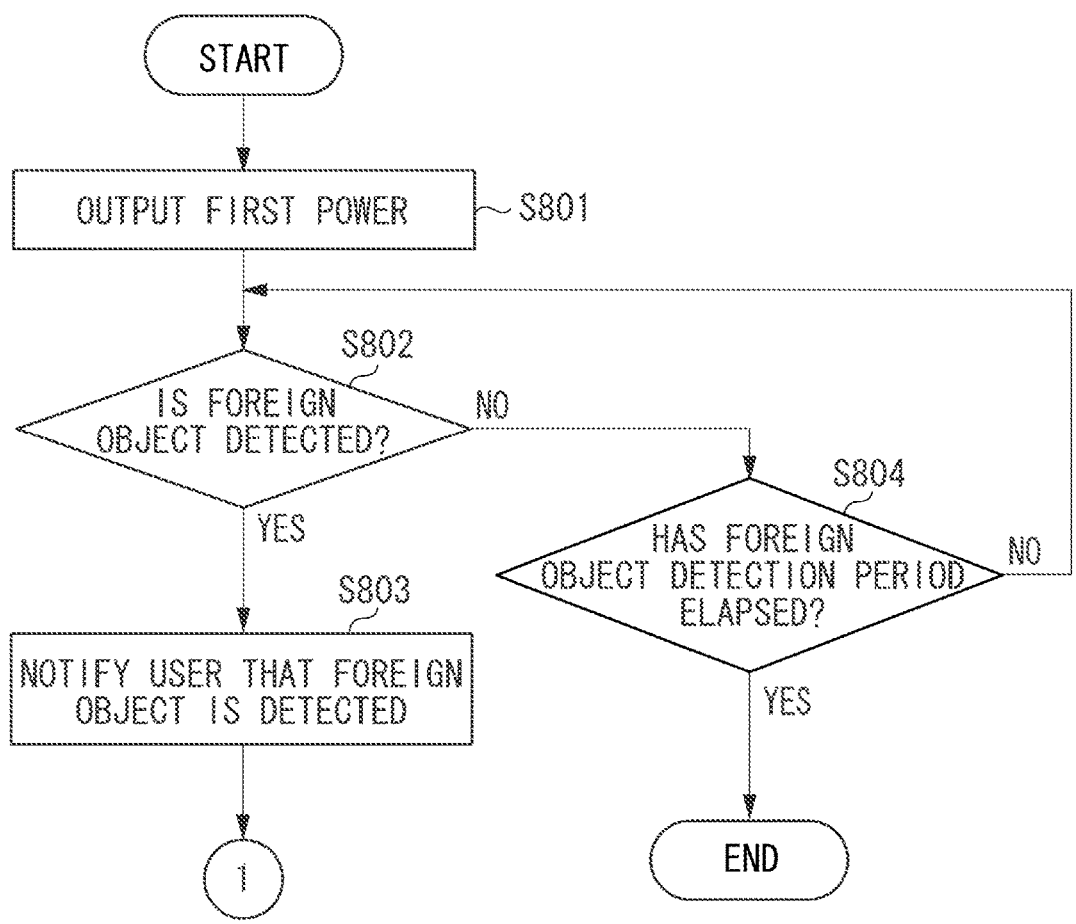
FIG. 8 is a flowchart illustrating an example of a detection process according to the first exemplary embodiment.

In the detection process in FIG. 8, the detection unit 112 continues detecting the VSWR to provide the information indicating the VSWR to the CPU 107 until the foreign object detection period is determined to have elapsed since the execution of the process of step S801 (YES in step S804).

In the detection process in FIG. 8, the CPU 107 causes the first power to be kept outputting via the power supply antenna 106 until the foreign object detection period is determined to have elapsed since the execution of the process of step S801 (YES in step S804).

In step S801, the CPU 107 controls at least one of the oscillator 102, the power generation unit 103, and the matching circuit 104 so as to output the first power to the electronic apparatus 200. However, the power expected not to be excessive power for the electronic apparatus 200 and the foreign object shall not be limited to the first power. Therefore, in step S801, the CPU 107 may cause power other than the first power to be output to the electronic apparatus 200 as long as the CPU 107 causes the power expected not to be excessive power for the electronic apparatus 200 and the foreign object to be output to the electronic apparatus 200.

(Power Reception Process)

Figure 9:
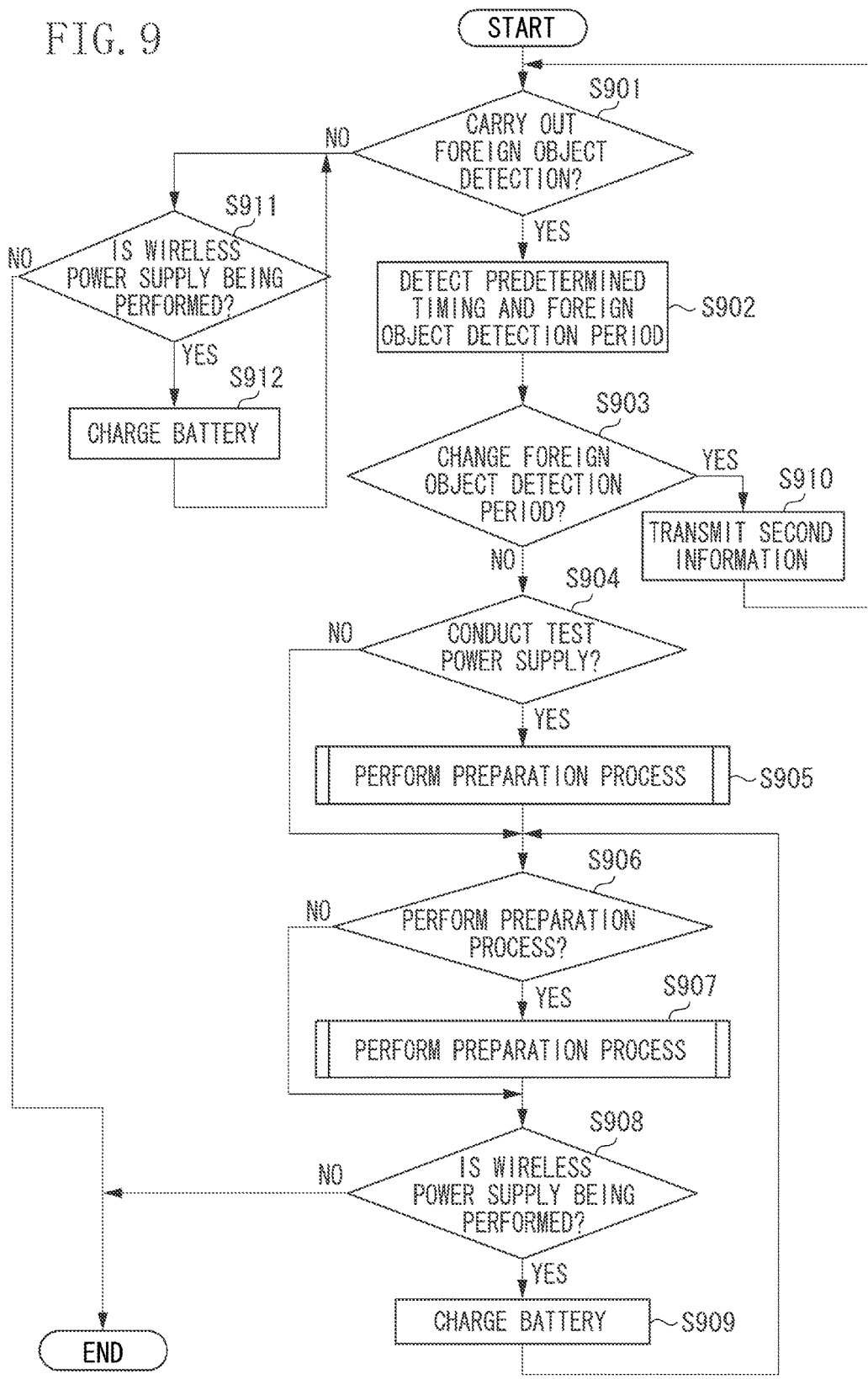
FIG. 9 is a flowchart illustrating an example of a power reception process according to the first exemplary embodiment.

A Power reception process performed by the electronic apparatus 200 will be described with reference to a flowchart illustrated in FIG. 9. Assume that, at the time of execution of the power reception process illustrated in FIG. 9, the communication unit 204 has completed the authentication for wirelessly communicating with the communication unit 105.

In step S901, the CPU 206 determines whether the power supply apparatus 100 will carry out the foreign object detection. If the information indicating that the power supply apparatus 100 will carry out the foreign object detection is received from the power supply apparatus 100 by the communication unit 204, the CPU 206 determines that the power supply apparatus 100 will carry out the foreign object detection (YES in step S901). If the information indicating that the power supply apparatus 100 will carry out the foreign object detection is not received from the power supply apparatus 100 by the communication unit 204, the CPU 206 determines that the power supply apparatus 100 will not carry out the foreign object detection (NO in step S901). Further, if the information indicating that the power supply apparatus 100 will not carry out the foreign object detection is received from the power supply apparatus 100 by the communication unit 204, the CPU 206 determines that the power supply apparatus 100 will not carry out the foreign object detection (NO in step S901). If the CPU 206 determines that the power supply apparatus 100 will carry out the foreign object detection (YES in step S901), the process proceeds to step S902. If the CPU 206 determines that the power supply apparatus 100 will not carry out the foreign object detection (NO in step S901), the process proceeds to step S911.

In step S902, the CPU 206 detects the foreign object detection period and the predetermined timing from the first information acquired from the power supply apparatus 100. Then, the process proceeds to step S903.

In step S903, the CPU 206 determines whether to change at least one of the foreign object detection period and the predetermined timing detected in step S902. If the CPU 206 determines to change at least one of the foreign object detection period and the predetermined timing (YES in step S903), the process proceeds to step S910. If the CPU 206 determines not to change the foreign object detection period and the predetermined timing (NO in step S903), the process proceeds to step S904.

In step S904, the CPU 206 determines whether the power supply apparatus 100 will conduct the test power supply. If the information for notifying the electronic apparatus 200 that the power supply apparatus 100 will conduct the test power supply is received from the power supply apparatus 100 by the communication unit 204, the CPU 206 determines that the power supply apparatus 100 will conduct the test power supply (YES in step S904). If the information for notifying the electronic apparatus 200 that the power supply apparatus 100 will conduct the test power supply is not received from the power supply apparatus 100 by the communication unit 204, the CPU 206 determines that the power supply apparatus 100 will not conduct the test power supply (NO in step S904). If the CPU 206 determines that the power supply apparatus 100 will conduct the test power supply (YES in step S904), the process proceeds to step S905. If the CPU 206 determines that the power supply apparatus 100 will not conduct the test power supply (NO in step S904), the process proceeds to step S906.

In step S905, the CPU 206 performs the preparation process with use of the power supplied from the battery 209. The preparation process will be described below. The preparation process is performed by the electronic apparatus 200 to improve accuracy for detecting a foreign object, when the power supply apparatus 100 performs the detection process. When the preparation process is executed, the process proceeds to step S906.

In step S906, the CPU 206 determines whether to perform the preparation process. The CPU 206 detects the predetermined timing from the first information included in the power supply status information 402 acquired from the power supply apparatus 100. Further, the CPU 206 determines whether to perform the preparation process according to the detected predetermined timing. If the CPU 206 determines to perform the preparation process (YES in step S906), the process proceeds to step S907. If the CPU 206 determines not to perform the preparation process (NO in step S906), the process proceeds to step S908.

In step S907, the CPU 206 performs the preparation process with use of the power supplied from the battery 209, similarly to step S905. Upon the execution of the preparation process, the process proceeds to step S908.

In step S908, the CPU 206 determines whether the power for charging the battery 209 is being supplied from the power supply apparatus 100 to the electronic apparatus 200. For example, the CPU 206 determines whether the power for charging the battery 209 is being supplied from the power supply apparatus 100 to the electronic apparatus 200, according to whether the direct-current power is being supplied from the rectification and smoothing circuit 203 to the power control unit 205. If any one of the first power and the second power is being output from the power supply apparatus 100 via the power supply antenna 106, the direct-current power is being supplied from the rectification and smoothing circuit 203 to the power control unit 205. In this case, the CPU 206 determines that the power for charging the battery 209 is being supplied from the power supply apparatus 100 to the electronic apparatus 200 (YES in step S908). If the direct-current power is being supplied from the rectification and smoothing circuit 203 to the power control unit 205 (YES in step S908), the process proceeds to step S909. If the first power and the second power are not being output from the power supply apparatus 100 via the power supply antenna 106, the direct-current power is not being supplied from the rectification and smoothing circuit 203 to the power control unit 205. In this case, the CPU 206 determines that the power for charging the battery 209 is not being supplied from the power supply apparatus 100 to the electronic apparatus 200 (NO in step S908). If the direct-current power is not being supplied from the rectification and smoothing circuit 203 to the power control unit 205 (NO in step S908), the process ends.

In step S909, the CPU 206 controls the charging unit 208 so as to charge the battery 209 with use of the power supplied from the power control unit 205. Then, the process returns to step S906.

In step S910, the CPU 206 changes at least one of the foreign object detection period and the predetermined timing. Further, the CPU 206 controls the communication unit 204 so as to transmit the second information indicating at least one of the changed foreign object detection period and predetermined timing to the power supply apparatus 100. Then, the process returns to step S901.

In step S911, the CPU 206 determines whether the power for charging the battery 209 is being supplied from the power supply apparatus 100 to the electronic apparatus 200, similarly to step S908. If the direct-current power is being supplied from the rectification and smoothing circuit 203 to the power control unit 205 (YES in step S911), the process proceeds to step S912. If the direct-current power is not being supplied from the rectification and smoothing circuit 203 to the power control unit 205 (NO in step S911), the process ends.

In step S912, the CPU 206 controls the charging unit 208 so as to charge the battery 209 with use of the power supplied from the power control unit 205, similarly to step S909. Then, the process returns to step S911.

(Preparation Process)

Next, the preparation process performed by the CPU 206 in at least one of steps S905 and S907 illustrated in FIG. 9 will be described with reference to a flowchart illustrated in FIG. 10. The CPU 206 executes the computer program stored in the memory 207, by which the preparation process can be realized.

When the power from the power supply apparatus 100 is supplied to at least one of the charging unit 208, the system 210, and the battery 209, the VSWR detected by the detection unit 112 changes according to the power consumed by at least one of the charging unit 208, the system 210, and the battery 209. Therefore, in the detection process illustrated in FIG. 8, the CPU 107 may incorrectly make the determination by misinterpreting the change in the VSWR actually due to the change in the power consumed by the electronic apparatus 200 as the change in the VSWR due to a foreign object placed in the vicinity of the power supply apparatus 100. In this case, the CPU 107 stops the wireless power supply to the electronic apparatus 200 even though there is actually no foreign object within the predetermined range, whereby the power supply apparatus 100 fails to appropriately control the wireless power supply to the electronic apparatus 200. To prevent such an incorrect determination, the electronic apparatus 200 performs the process of step S1001 to eliminate or reduce an influence from the change in the power consumed by the electronic apparatus 200.

In step S1001, the CPU 206 starts the process for keeping the load of the electronic apparatus 200 constant to improve the accuracy for detecting a foreign object by the power supply apparatus 100. The CPU 206 performs any one of the first process, the second process, the third process, the fourth process, the fifth process, and the sixth process as the process for keeping the load of the electronic apparatus 200 constant.

When any one of the first process, the second process, the third process, the fourth process, the fifth process, and the sixth process is performed in step S1001, the load of the electronic apparatus 200 is controlled so as to be kept constant. This control results in a reduction of the change in the load of the electronic apparatus 200, thereby succeeding in eliminating or reducing the influence due to the change in the power consumed by the electronic apparatus 200. Upon the execution of the process of step S1001, the CPU 206 controls the timer 214 so as to measure a time elapsed since the start of the process for keeping the load of the electronic apparatus 200 constant. Then, the process proceeds to step S1002.

Figure 10:
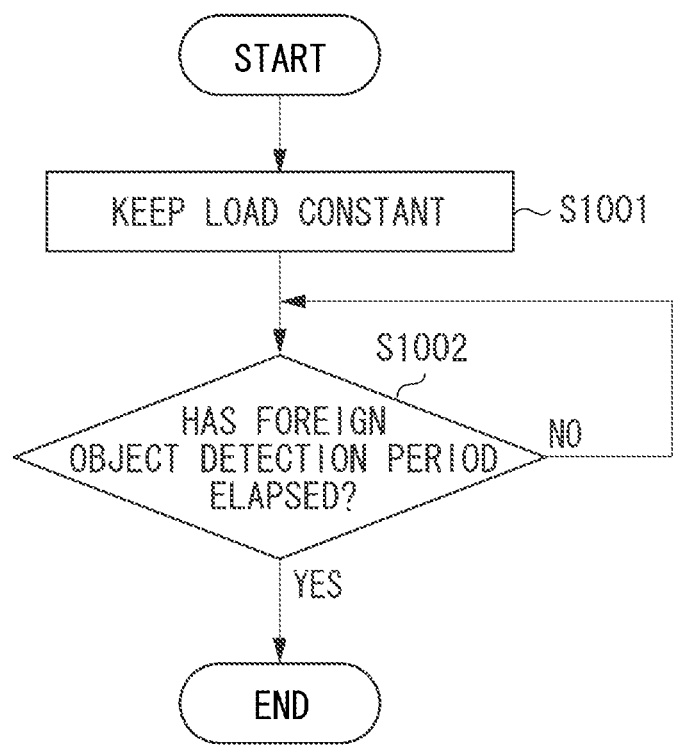
FIG. 10 is a flowchart illustrating an example of a preparation process according to the first exemplary embodiment.

If performing any one of the first process, the second process, the third process, and the fourth process in step S1001, the CPU 206 performs the preparation process illustrated in FIG. 10 with use of the power supplied from the battery 209. On the other hand, if performing any one of the fifth process and the sixth process in step S1001, the CPU 206 performs the preparation process illustrated in FIG. 10 with use of the power supplied from the rectification and smoothing circuit 203.

In step S1002, the CPU 206 determines whether the foreign object detection period has elapsed since the start of the process for keeping the load of the electronic apparatus 200 constant. If the time measured by the timer 214 reaches the foreign object detection period included in the power supply status information 402, the CPU 206 determines that the foreign object detection period has elapsed (YES in step S1002). If the time measured by the timer 214 does not reach the foreign object detection period included in the power supply status information 402, the CPU 206 determines that the foreign object detection period has not elapsed (NO in step S1002). If the foreign object detection period has not elapsed (NO in step S1002), the process returns to step S1002. If the foreign object detection period has elapsed (YES in step S1002), the process ends.

If the foreign object detection period has elapsed (YES in step S1002), the CPU 206 stops the process for keeping the load of the electronic apparatus 200 constant, and restores the state of the load of the electronic apparatus 200 to its original state. When the preparation process is performed in step S905, after the foreign object detection period has elapsed (YES in step S1002), the process proceeds to step S906 illustrated in FIG. 9. When the preparation process is performed in step S907, after the foreign object detection period has elapsed (YES in step S1002), the process proceeds to step S908 illustrated in FIG. 9.

If the first process is performed in step S1001, after the foreign object detection period has elapsed (YES in step S1002), the CPU 206 switches on the switch 202a, thereby establishing a connection between the power reception antenna 201 and the matching circuit 202. On the other hand, if the second process is performed in step S1001, after the foreign object detection period has elapsed (YES in step S1002), the CPU 206 switches on the switch 202b, thereby establishing a connection between the power reception antenna 201 and the matching circuit 202. On the other hand, if the third process is performed in step S1001, after the foreign object detection period has elapsed (YES in step S1002), the CPU 206 switches on the switch 506, thereby establishing a connection between the rectification and smoothing circuit 203 and the power control unit 205. On the other hand, if the fourth process is performed in step S1001, after the foreign object detection period has elapsed (YES in step S1002), the CPU 206 switches off the switch 507 and switches on the switch 506, thereby establishing a connection between the rectification and smoothing circuit 203 and the power control unit 205. On the other hand, if the fifth process is performed in step S1001, after the foreign object detection period has elapsed (YES in step S1002), the CPU 206 controls the control unit 504 to stop the process for controlling the converter 503 so as to match the impedance Zin with the predetermined impedance. On the other hand, if the sixth process is performed in step S1001, after the foreign object detection period has elapsed (YES in step S1002), the CPU 206 cancels the process for controlling the process for stopping the operation of the charging unit 208 and the operation of the system 210.

Alternatively, the CPU 206 may perform the first to sixth processes so as to keep the power consumed by the electronic apparatus 200 within the predetermined range. The predetermined range only needs to be a range in which the detection unit 112 does not detect a foreign object when the power consumed by the electronic apparatus 200 changes during the foreign object detection period. For example, the range only needs to be a range in which the difference between the VSWR detected by the detection unit 112 and the reference value is smaller than the first value.

In this manner, the electronic apparatus 200 according to the first exemplary embodiment is configured to perform control so as to prevent the load of the electronic apparatus 200 from changing while the power supply apparatus 100 performs the process for detecting a foreign object. In this case, the power supply apparatus 100 can perform the process for detecting a foreign object without being affected by the change in the impedance of the load of the electronic apparatus 200. As a result, the power supply apparatus 100 can reduce such an incorrect determination that the power supply apparatus 100 determines that there is a foreign object even though there is actually no foreign object. Therefore, the electronic apparatus 200 can allow the power supply apparatus 100 to detect a foreign object highly accurately.

Further, the electronic apparatus 200 is configured to notify the power supply apparatus 100 of the method for performing control so as to prevent the load of the electronic apparatus 200 from changing. In this case, the power supply apparatus 100 can set the foreign object detection period and the predetermined timing according to the notification from the electronic apparatus 200. As a result, the power supply apparatus 100 can detect a foreign object highly accurately according to the capability of the electronic apparatus 200.

In the first exemplary embodiment, the detection unit 112 is configured to detect the VSWR, and the CPU 107 is configured to detect whether a foreign object is placed in the vicinity of the power supply apparatus 100 with use of the data indicating the VSWR that the CPU 107 is notified of from the detection unit 112. However, the detection method is not limited thereto.

For example, the detection unit 112 may be configured to detect the current flowing in the power supply antenna 106, instead of the VSWR. In this case, in step S709, the CPU 107 acquires information indicating the current that the CPU 107 is notified of from the detection unit 112 when the process of step S708 is performed, and sets a value of the current that the CPU 107 is notified of from the detection unit 112 into the RAM 109 as the reference value. Further, in step S802, the CPU 107 determines whether there is a foreign object within the predetermined range with use of the information indicating the current provided from the detection unit 112. In this case, if a difference between the current detected by the detection unit 112 and the reference value is a second value or larger, the CPU 107 determines that there is a foreign object within the predetermine range. The second value is a value corresponding to an amount by which the current is assumed to change when a foreign object is placed within the predetermined range. In this case, if the difference between the current detected by the detection unit 112 and the reference value is not the second value or larger, the CPU 107 determines that there is no foreign object within the predetermine range.

Alternatively, for example, the detection unit 112 may be configured to detect a voltage of the power supply antenna 106, instead of the VSWR. In this case, in step S709, the CPU 107 acquires information indicating the voltage that the CPU 107 is notified of from the detection unit 112 when the process of step S708 is performed, and sets a value of the voltage that the CPU 107 is notified of from the detection unit 112 into the RAM 109 as the reference value. Further, in step S802, the CPU 107 determines whether there is a foreign object within the predetermined range with use of the information indicating the voltage provided from the detection unit 112. In this case, if a difference between the voltage detected by the detection unit 112 and the reference value is a third value or larger, the CPU 107 determines that there is a foreign object within the predetermine range. The third value is a value corresponding to an amount by which the voltage is assumed to change when a foreign object is placed within the predetermined range. In this case, if the difference between the voltage detected by the detection unit 112 and the reference value is not the third value or larger, the CPU 107 determines that there is no foreign object within the predetermine range.

In the first exemplary embodiment, the power supply apparatus 100 and the electronic apparatus 200 are assumed to wirelessly communicate with each other based on the NFC standard. However, the power supply apparatus 100 and the electronic apparatus 200 may wirelessly communicate with each other based on another standard than the NFC standard. For example, the power supply apparatus 100 and the electronic apparatus 200 may perform wireless communication in compliance with the International Organization for Standardization (ISO)/International Electrotechnical Commission (IEC) 18092 standard, instead of the NFC standard. Further alternatively, the power supply apparatus 100 and the electronic apparatus 200 may perform wireless communication in compliance with Radio Frequency IDentification (RFID), instead of the NFC standard. Alternatively, the power supply apparatus 100 and the electronic apparatus 200 may perform wireless communication in compliance with the ISO/IEC 14443 standard, instead of the NFC standard. Further alternatively, the power supply apparatus 100 and the electronic apparatus 200 may perform wireless communication in compliance with the TransferJet (registered trademark) standard, instead of the NFC standard. Further alternatively, the power supply apparatus 100 and the electronic apparatus 200 may perform wireless communication in compliance with the ISO/IEC 21481 standard, instead of the NFC standard. Further alternatively, the power supply apparatus 100 and the electronic apparatus 200 may perform wireless communication in compliance with the Bluetooth (registered trademark) standard or a wireless local area network (LAN) standard, instead of the NFC standard.

In the first exemplary embodiment, the power supply apparatus 100 is configured to supply the second power to the electronic apparatus 200 with use of the power supply antenna 106, and perform the communication between the communication unit 105 and the electronic apparatus 200 with use of the power supply antenna 106. However, the use of the antenna shall not be limited thereto. For example, the power supply apparatus 100 may be configured to separately include an antenna for supplying the second power to the electronic apparatus 200, and an antenna for performing the communication between the communication unit 105 and the electronic apparatus 200. Therefore, a resonance frequency corresponding to the antenna for supplying the second power to the electronic apparatus 200, and a resonance frequency corresponding to the antenna for performing the communication between the communication unit 105 and the electronic apparatus 200 may be equal frequencies, or may be different frequencies. In this case, the resonance frequency corresponding to the antenna for supplying the second power to the electronic apparatus 200 may be 6.78 MHz, or may be a frequency of 100 KHz to 250 KHz. The resonance frequency corresponding to the antenna for performing the communication between the communication unit 105 and the electronic apparatus 200 may be another frequency than 13.56 MHz as long as this frequency is a frequency corresponding to the communication standard of the communication unit 105.

Further, the electronic apparatus 200 is configured to receive the power from the power supply apparatus 100 with use of the power reception antenna 201, and perform the communication between the power supply apparatus 100 and the communication unit 204 with use of the power reception antenna 201. However, the use of the antenna shall not be limited thereto. For example, the electronic apparatus 200 may be configured to separately include an antenna for receiving the power from the power supply apparatus 100, and an antenna for performing the communication between the power supply apparatus 100 and the communication unit 204. Therefore, a resonance frequency corresponding to the antenna for receiving the power from the power supply apparatus 100, and a resonance frequency corresponding to the antenna for performing the communication between the power supply apparatus 100 and the communication unit 204 may be equal frequencies, or may be different frequencies. In this case, the resonance frequency corresponding to the antenna for receiving the power from the power supply apparatus 100 may be 6.78 MHz, or may be a frequency of 100 KHz to 250 KHz. The resonance frequency corresponding to the antenna for performing the communication between the power supply apparatus 100 and the communication unit 204 may be another frequency than 13.56 MHz as long as this frequency is a frequency corresponding to the communication standard of the communication unit 204.

Other Embodiments

The power supply apparatus 100 according to the present invention is not limited to the power supply apparatus 100 described in the first exemplary embodiment. Further, the electronic apparatus 200 according to the present invention is not also limited to the electronic apparatus 200 described in the first exemplary embodiment. For example, each of the power supply apparatus 100 and the electronic apparatus 200 according to the present invention can be also realized by a system including a plurality of apparatuses.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-192881, filed Sep. 22, 2014, which is hereby incorporated by reference herein in its entirety.

What is claimed is:

1. An electronic apparatus comprising:
a power reception unit configured to wirelessly receive power from a power supply apparatus;
a load configured to receive the power from the power reception unit;
a communication unit configured to receive a detection period, during which the power supply apparatus detects a foreign object, from the power supply apparatus and to notify a control unit of the detection period; and
the control unit configured to perform a process for keeping power consumed by the electronic apparatus in a predetermined range until the detection period elapses,
wherein the process keeps the load constant by keeping an impedance of the load at a constant value.

2. The electronic apparatus according to claim 1, wherein the process is a process for keeping power consumed by the electronic apparatus constant until the detection period elapses.

3. The electronic apparatus according to claim 1, wherein the load includes at least one of an imaging unit, a reproduction unit, and a recording unit.

4. The electronic apparatus according to claim 1, further comprising a charging unit configured to charge a battery with use of the power supplied from the power reception unit,
wherein the process is a process for preventing a connection between the power reception unit and the charging unit.

5. The electronic apparatus according to claim 1, wherein the control unit performs the process before higher power than power for communicating with the communication unit is supplied from the power supply apparatus.

6. The electronic apparatus according to claim 1, wherein the detection period is set according to the power supplied from the power supply apparatus.

7. The electronic apparatus according to claim 1, wherein the detection period is set according to a state regarding the electronic apparatus.

8. The electronic apparatus according to claim 1, wherein the predetermined range is a range in which the power supply apparatus does not detect a foreign object when the power consumed by the electronic apparatus changes during the foreign object detection period.

9. A method for controlling an electronic apparatus having a load, the method comprising:
receiving power wirelessly from a power supply apparatus;
providing the power to the load;
communicating with the power supply apparatus to acquire a detection period during which the power supply apparatus detects a foreign object; and
performing a process for keeping power consumed by the electronic apparatus in a predetermined range until the detection period has elapsed,
wherein the process keeps the load constant by keeping an impedance of the load at a constant value.

* * * * *